E. L. BRACY.
MACHINE FOR MAKING PAPER BAGS AND FOR PACKETING TOBACCO AND OTHER MATERIALS.
APPLICATION FILED MAR. 6, 1909.

956,623.

Patented May 3, 1910.
11 SHEETS—SHEET 6.

E. L. BRACY.
MACHINE FOR MAKING PAPER BAGS AND FOR PACKETING TOBACCO AND OTHER MATERIALS.
APPLICATION FILED MAR. 6, 1909.

956,623.

Patented May 3, 1910.
11 SHEETS—SHEET 8.

E. L. BRACY.
MACHINE FOR MAKING PAPER BAGS AND FOR PACKETING TOBACCO AND OTHER MATERIALS.
APPLICATION FILED MAR. 6, 1909.

956,623.

Patented May 3, 1910.
11 SHEETS—SHEET 9.

Witnesses:
W. P. Burke
Edw. D. Spring

Inventor:
Edward Leray Bracy

UNITED STATES PATENT OFFICE.

EDWARD LEROY BRACY, OF SCOTLAND NECK, NORTH CAROLINA, ASSIGNOR TO RICHARD HARVEY WRIGHT, OF DURHAM, NORTH CAROLINA.

MACHINE FOR MAKING PAPER BAGS AND FOR PACKETING TOBACCO AND OTHER MATERIALS.

956,623.  Specification of Letters Patent.  Patented May 3, 1910.

Application filed March 6, 1909. Serial No. 481,597.

*To all whom it may concern:*

Be it known that I, EDWARD LEROY BRACY, a citizen of the United States of America, residing at Scotland Neck, North Carolina, United States of America, have invented new and useful Improvements in Machines for Making Paper Bags and for Packeting Tobacco and other Materials, of which the following is a specification.

This invention relates to machinery for packeting tobacco or other material of the already known kind in which the various operations incidental to the making of the paper or other bags and filling them with the material to be packeted, are performed in one and the same machine. In some of the known machines of this kind the bags are made by folding devices, on a series of formers carried by an intermittently rotating wheel or the like to which formers the paper is presented by a tilting rest and folded around it by a sliding forked member; the bags are then transferred by a plunger acting in the formers into a series of molds or holders carried by a second intermittently rotating wheel or the like, and while in these molds or holders are filled with material delivered to them from weighing or measuring devices and, after being properly closed, are ejected from the machine as complete packets.

According to my present invention I employ an intermittently rotating wheel or the like carrying the bag formers but provided with improved devices for feeding the paper or other bag-making material to the formers and for making the first fold of such bag-making material around the former, for removing the bags from the formers and depositing them in the molds or holders, and for holding the folded vertical edges of the bags against the inner edges of the formers as the wheel rotates; a second intermittently rotating wheel or the like carrying the molds or holders, but having beneath it a yielding path for preventing the folded bottoms of the bags from springing open, and a third intermittently rotating wheel or the like carrying a series of charging receptacles of peculiar construction and arrangement which receive the material from a stationary measuring apparatus and deliver it to the bags in the molds. And in order that my said invention may be fully understood I will proceed to describe the same with the aid of the accompanying eleven sheets of drawings in which:—

Fig. 2 is an elevation taken at right angles to Fig. 1 and looking from left to right in that figure; Fig. 2$^a$ is a separate view of one of the formers; Fig. 4 is an elevation similar to Fig. 3, but with certain of the parts shown in that figure removed in order to show parts behind clearer than in that figure; Fig. 18 is a section taken on the line D—D of Fig. 15.

Similar letters and figures of reference relate to like parts in all the figures of the drawings.

$a$ represents the base plate of the machine mounted on legs as shown, $a^x$ and $a^2$ are platforms carried on the base plate $a$ by pillars as shown, $b$ is a driving shaft rotating in bearings $c$ mounted on the base plate $a$. The shaft $b$ may be driven by a belt pulley as shown. $d$ is a counter-shaft rotating in bearings $e$, $f$, $g$ (Fig. 6) also mounted on the base plate $a$. The shaft $d$ is driven from the shaft $b$ by means of sprocket wheels $h$, $i$ and a chain $j$ (Fig. 6) or by any other suitable means.

Figure 6:
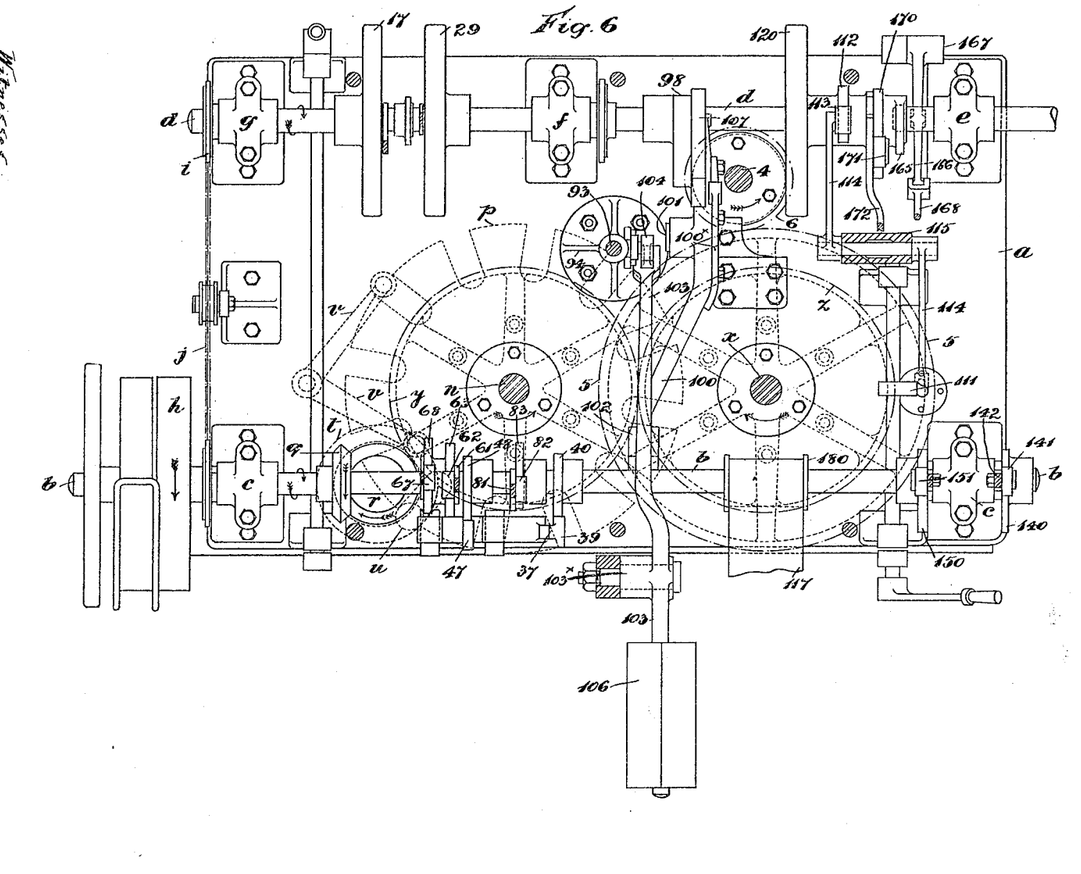
Fig. 6 is also a plan similar to Fig. 5, but with certain parts shown in that figure removed to show clearer those below.

$k$ is the intermittently rotating wheel on the underside of which are secured the series of bag-formers $m$, in the case shown twelve in number. The wheel $k$ is mounted on a vertical shaft $n$ rotating in suitable bearings in the base plate $a$ and a platform $a^x$ and has mounted upon it the star-wheel $p$ provided with twelve notches as shown in Fig. 6. On the shaft $b$ is mounted a miter-wheel $q$ which gears with a miter-wheel $r$ fixed on the upper end of a short shaft rotating in a long bearing $s$, and carrying at its lower end a disk or crank $t$ carrying a pin or a friction-roller $u$ which engages with one of the notches in the star-wheel $p$ at each revolution of the disk $t$ thereby causing the said star-wheel $p$, and with it the former wheel $k$ to make one twelfth of a revolution for each revolution of the short vertical shaft and shaft $b$. $v$ is a check arm for locking the star-wheel in position after each twelfth part of a revolution, in a manner that will be well understood in connection with intermittently acting gear of this kind.

$w$ is a wheel upon which are mounted the series of molds also, in this case, twelve in number. This wheel $w$ is mounted on a vertical shaft $x$ rotating in suitable bearings in the base plate $a$ and platform $a^2$ and receives an intermittent rotatory motion synchronously with that of the former-wheel $k$ by means of the equal spur-wheels $y$, $z$.

2 is a wheel carrying four charging receptacles 3 and mounted upon a vertical shaft 4 rotating in suitable bearings in the base plate $a$ and platform $a^2$. This wheel 2 with its shaft 4 is caused to rotate intermittently at a speed of three to one of the former and mold-wheels by means of a spur-wheel 5 mounted on the shaft $x$ and gearing with a spur-wheel 6 mounted on the shaft 4, and having a diameter equal to one-third of that of the spur-wheel 5. The wheels $k$, $w$ and 2 rotate in the directions shown by the arrows in Figs. 5 and 6.

Figure 16:
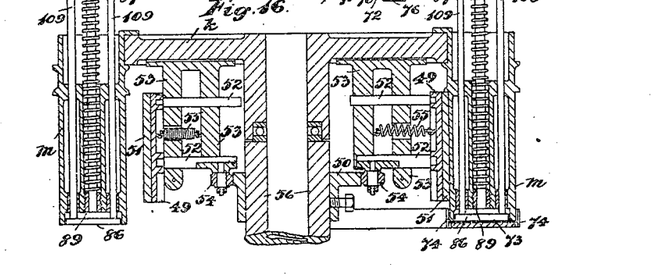

The formers $m$ are hollow and contain pistons or plungers as shown in Fig. 16 to be hereinafter described.

Figure 1:
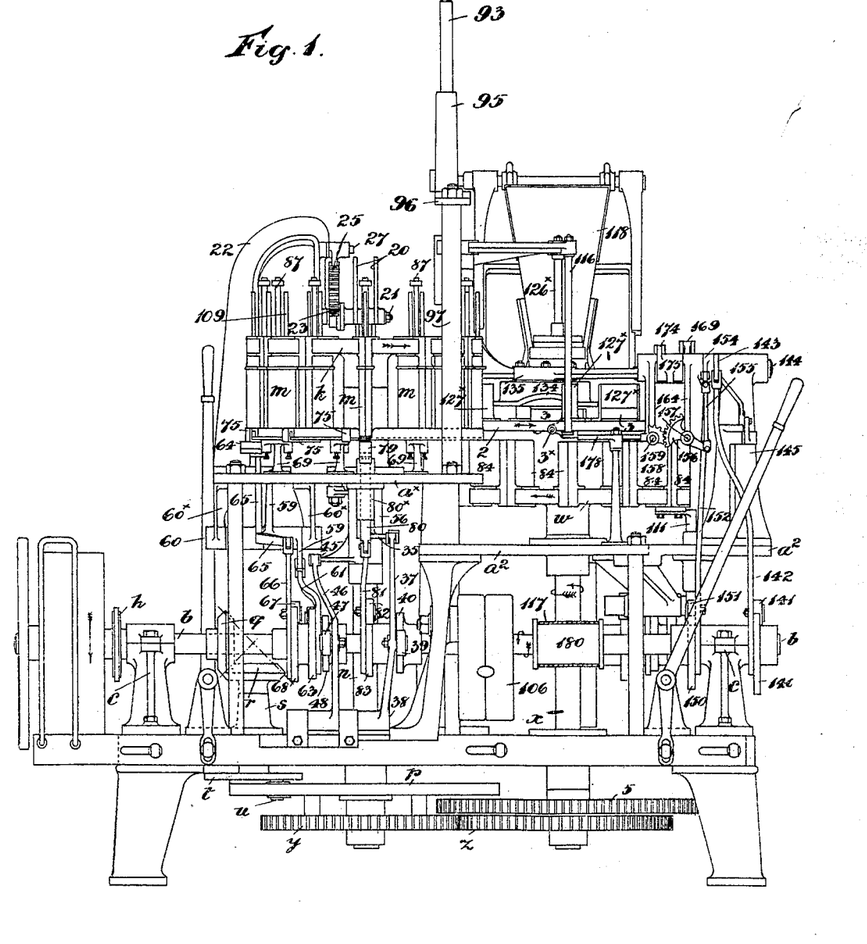
Figure 1 is an elevation of a machine constructed in accordance with my invention.
Figures 2, 2A:
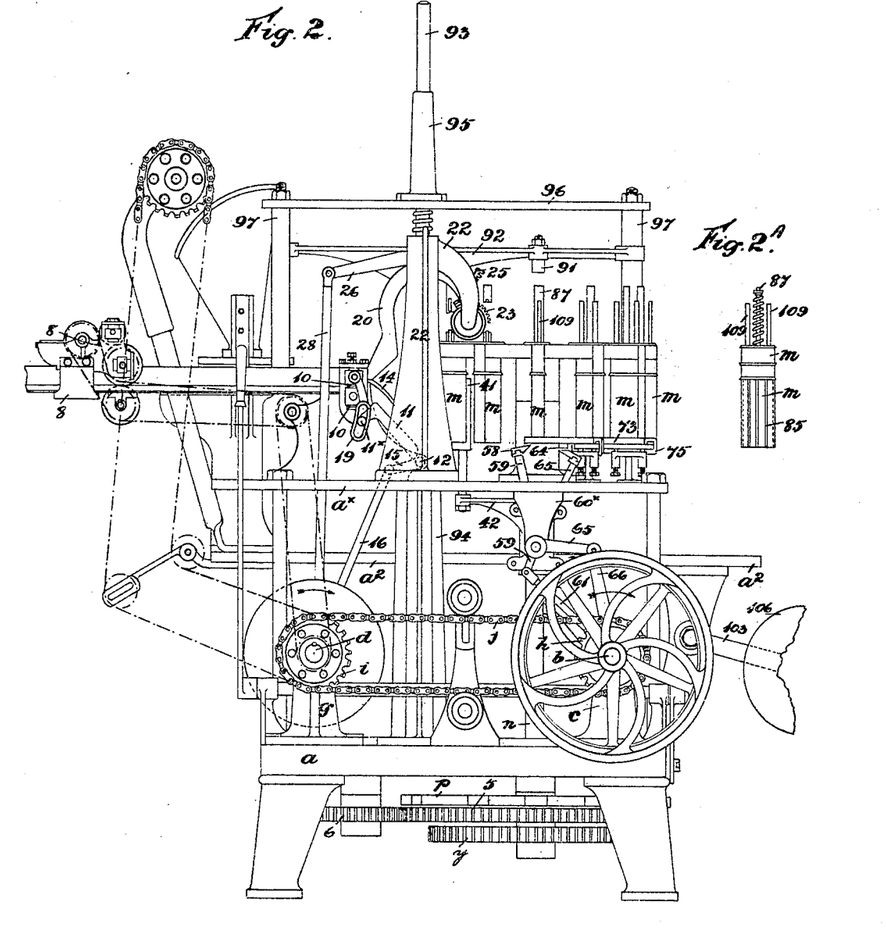
Figure 5:
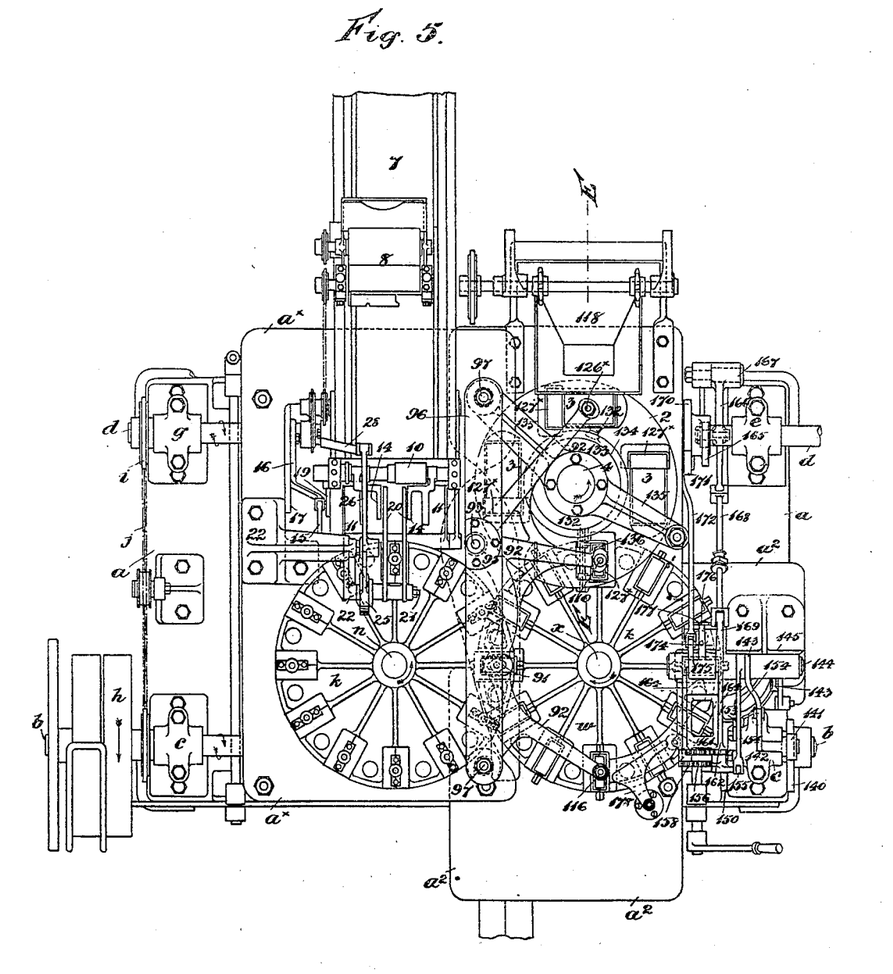
Fig. 5 is a plan.
Figure 20:
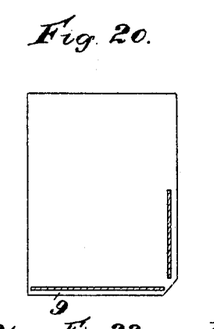
Fig. 20 represents a sheet of paper intended to form a bag, as it is fed into the machine, the cross-hatched parts showing where it is gummed or pasted to secure the side and bottom folds when they are respectively brought together on the former.

The sheets of paper, intended to form the bags, and which are of the shape shown in Fig. 20, are fed one by one intermittently along a horizontal guideway 7 where the edges which are to form the side and bottom of the bag are pasted or gummed as shown in Fig. 20 by any suitable arrangement of pasting or gumming device such as that shown at 8 in Figs. 2 and 5, the paper sheets being traversed along the guideway 7 in the direction of the length of the bag with the bottom edge 9 leading. At the end of the guideway 7 the sheet of pasted paper passes between a pair of horizontal feed rollers 10 on to an inclined rest 11, which is hinged at its lower end at 12, and has a projecting blade spring 13 in its central part. The paper is guided on to this inclined rest by curved guide bars 14 which may be pivotally mounted upon the same axis as one of the feed rollers 10. The inclined rest 11 is then caused to turn on its hinge-joint 12 until it and the sheet of paper assume the vertical position, and the central part of the paper is pressed by the beforementioned blade spring 13 against the outer longitudinal edges of one of the formers $m$ on the former-wheel $k$, see Fig. 8. This movement of the inclined rest 11 into the vertical position is effected by means of an arm 15 fixed on the hinge-pivot 12 and operated by a link 16 having a forked end which slides on the counter-shaft $d$. The link 16 is operated by a cam 17 on the shaft $d$ acting upon a friction-roller 18 on the said link 16. The movement of the inclined rest into the vertical position causes the curved guide bars 14 to be raised out of the way of the former by means of a stud $11^x$ on the rest 11 taking into the curved slot of an arm 19 connected with the guide-bars 14.

Figure 7:
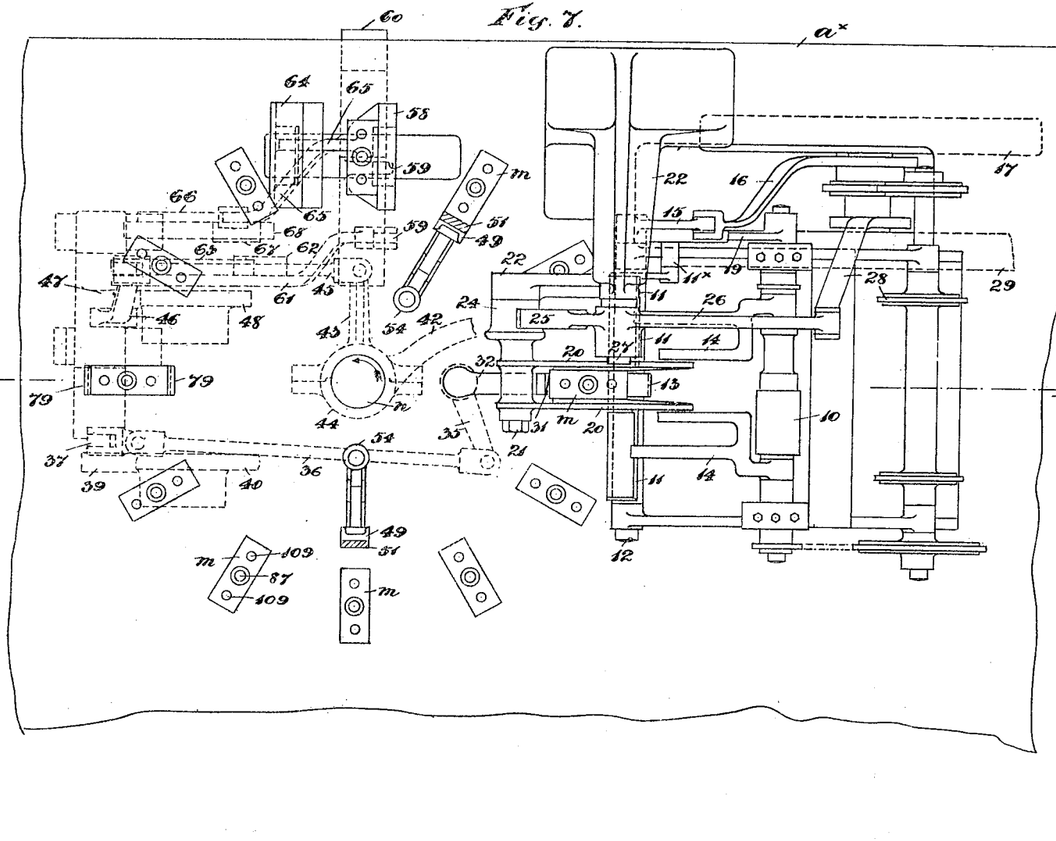
Fig. 7 is a plan, partly diagrammatic and to a larger scale than Figs. 1 to 6, of parts of the machine concerned in the making of the bags.
Figures 8, 9, 10, 11, 12:
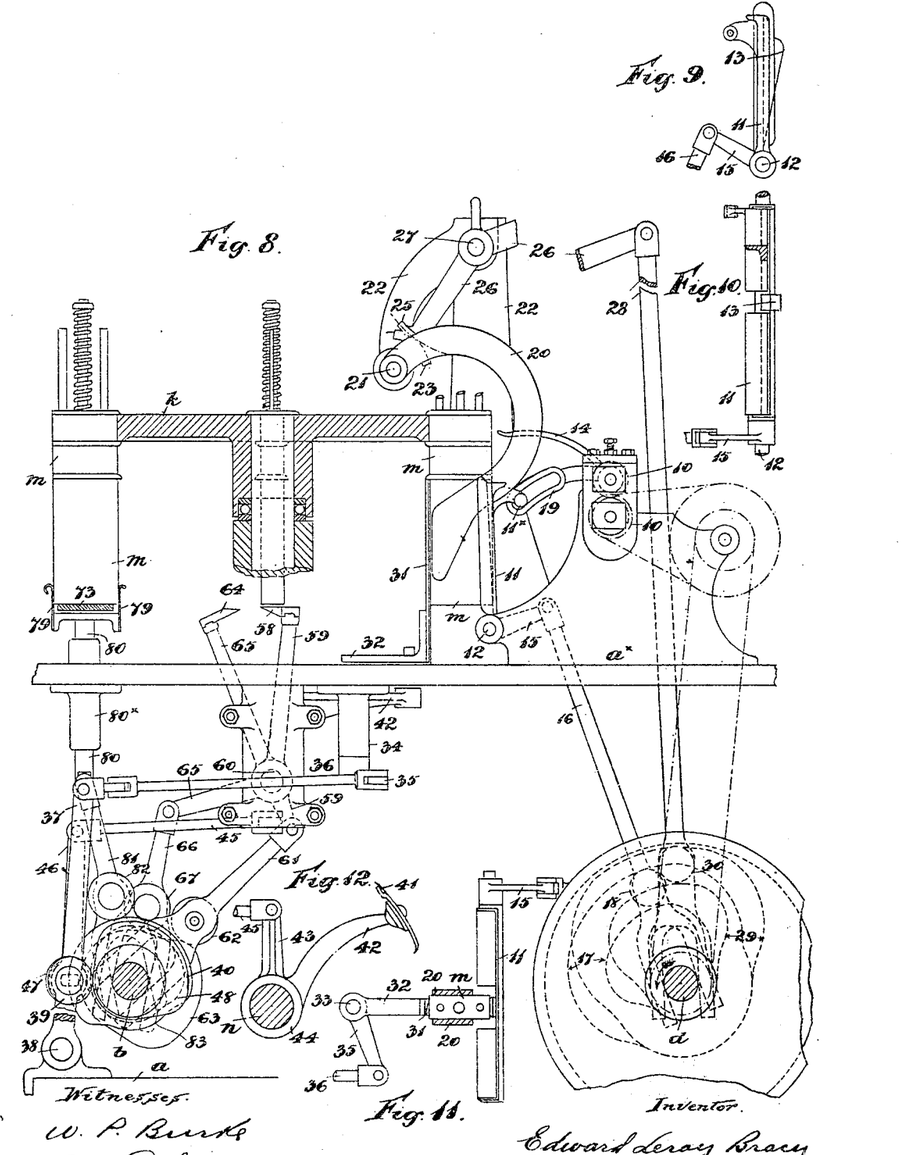
Fig. 8 is a sectional elevation taken on the line A—A of Fig. 7 and drawn to the same scale as that figure.
Figs. 9, 10, 11 and 12 are detail views of parts shown in Fig. 8.
Figure 21:
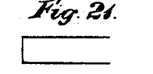
Figs. 21 to 29 inclusive show the paper intended to form a bag, in its various stages of formation from the first fold to its completion.
Figure 22:
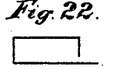

As soon as the paper is in the vertical position against the outer edge of the former $m$ two segmental arms 20, see Figs. 7 and 8, are caused to descend in a curved path between the bars of the rest 11, and their ends engage with the paper and bend it on to the two broad sides of the former $m$, so that the two longitudinal side edges of the paper extend beyond the inner edge of the former, that is to say the paper is bent into the shape shown in Fig. 21. These segmental arms are pivoted on a stud 21 fixed to a bracket 22 mounted upon the platform $a^x$ of the machine. Motion is imparted to the segmental arms 20 by the following means:—23 is a toothed sector connected to or formed with the boss 24 of the segmental arms 20. This toothed sector gears with a toothed sector 25 on the end of one arm of a lever 26 pivoted at 27 on the bracket 22. The other arm of the lever 26 is pin-jointed to a link 28 the lower forked end of which slides on the shaft $d$. This link is moved upward so as to bring the segmental arms 20 into the position shown in Fig. 8 by means of the cam 29 on the shaft $d$ acting upon the friction-roller 30 on the link 28. A vertical folding bar 31, see Figs. 8 and 11, now approaches in one direction and presses the projecting unpasted longitudinal edge of the paper against the inner edge of the former $m$, that is to say into the position shown in Fig. 22. The folding bar 31 is carried on an arm 32 fixed upon a fulcrum pin 33 turning in a long bearing 34 fixed to the upper platform $a^x$ of the machine; the lower end of fulcrum pin 33 has secured to it an arm 35 to which is pin-jointed a link 36, the other end of which is pin-jointed to a lever-arm 37 pivoted to the base plate $a$ at 38. This lever-arm 37 carries a friction-roller 39 which is acted upon by a cam 40 mounted on the driving shaft $b$, and which serves to operate the folding bar 31 at the proper time.

Figure 23:
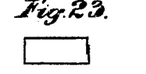

A second vertical folding plate 41 presses the corresponding pasted edge of the paper down upon the folded unpasted edge, that is to say into the position shown in Fig. 23. This second vertical folder 41 is operated as follows:—The folder is carried on an arm 42 which is in one piece with another arm 43, the boss 44, common to both, being mounted and free to turn on the vertical shaft $n$ of the former wheel $k$. The arm 43 is pin-jointed to one end of a link 45 the other end of which is pin-jointed to a lever 46 pivoted at 38, and carrying a friction roller 47 which is acted upon by a cam 48 mounted on the driving shaft $b$.

When the second vertical fold has been completed the former-wheel $k$ is caused to make one-twelfth of a revolution by means of the star-wheel gear above described, the last named folding plate 41 continuing to rotate in the same direction but at a slower speed than the former whereby the said folding plate is made to effect a rubbing or smearing movement upon the paper joint. As soon as the former-wheel $k$ has completed the one-twelfth of a revolution the folding plate 41 stops; and a presser-bar 49 (see Figs. 15 and 16) which had been held back during the folding operation by means of a spring 55, is moved forward and presses the pasted fold of the paper against the inner edge of the former during the continued rotation of the wheel $k$. The presser-bar 49 is preferably faced with india-rubber or other suitable yielding material 51, and is mounted on guide rods 52 which slide in a bracket 53 fixed to the underside of the former-wheel $k$. A friction-roller 54 turns on a stud fixed to the lowermost guide rod 52 and the presser-bar 49 is constantly drawn by the spring 55 toward the axis of the former-wheel, pressing the roller 54 constantly against the edge of the cam 50, which is fixed to the boss 56 forming the upper bearing of the shaft $n$. It will be readily understood that as the formers rotate the friction-rollers 54, and with them the presser-bars 49, are pressed outward as they pass around the larger part of the cam 50, and are drawn inward by the springs 55 as they pass around the smaller part of the said cam.

Figures 24, 25:
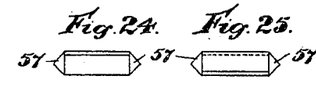
Figure 26:
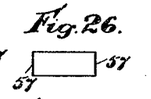
Figure 27:
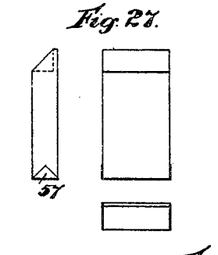
Figure 28:
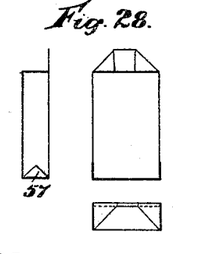

The lower edges of the paper which project below the bottom of the former are brought by the continued intermittent rotation of the wheel $k$ over suitable folding devices which first turn-in the unpasted edge of the lower part of one side of the paper, that is to say into the position shown in Fig. 24, and then the pasted edge of the lower part of the other side of the paper over the first, that is to say into the position shown in Fig. 25, leaving a triangular shaped ear or tab 57 (Fig. 25) projecting at each end of the bottom of the now completed bag.

The devices for folding the lower edges of the paper are shown most clearly in Figs. 6, 7 and 8. 58 is the folder that makes the first fold of the lower edges; this is mounted on one arm of a bell-crank lever 59 pivoted on a fixed stud 60 carried in brackets $60^x$ fixed to the upper platform $a^x$, the other arm of the lever 59 is pin-jointed to a link 61 the forked lower end of which slides on the shaft $b$. A friction-roller 62 on the link 61 is acted upon by the cam 63 on the shaft $b$, and the folder 58 is thereby operated. 64 is the folder that makes the second fold of the lower edges; this is mounted on one arm of a bell-crank lever 65 pivoted also on the stud 60, the other arm of the lever 65 is pin-jointed to a link 66, the forked lower end of which slides on the shaft $b$. A friction-roller 67 on the link 66 is acted upon by the cam 68 on the shaft $b$, and the folder 64 is thereby operated.

Figures 13, 15, 17:
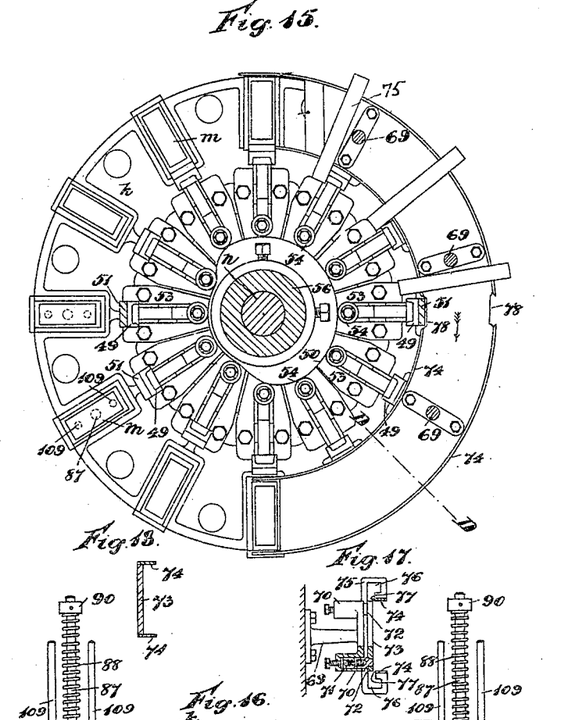
Fig. 13 is an elevation, and Fig. 14 a section on line B—B of Fig. 13, both drawn to a still larger scale than Figs. 7 to 12, of one of the formers employed in shaping the bags.
Fig. 15 is an underside view, and Fig. 16 a sectional elevation, drawn to the same scale as Figs. 7 and 8, of the series of formers mounted upon the underside of the intermittently rotating former wheel.
Fig. 17 is a detail view looking toward the end of the bottom 73 of the trough, portions of this figure being shown in section.

The folded bottom joint of the bag is prevented from springing open as it is carried around by the further intermittent rotation of the former-wheel, by means of a segmental spring-urged trough the bottom of which forms a yielding path for the bottom of the bag as it is carried around, see Figs. 15, 16 and 17. This trough is supported on pillars 69 fixed to the upper platform $a^x$. These pillars are provided with hollow sockets 70 in which are placed adjustable springs 71 upon which rest the legs 72 of the yielding bottom 73 of the trough. The sides 74 of the trough are supported by the cross pieces 75 which are provided with spaces 76 that allow the beforementioned triangular ears or tabs 57 of the bag bottom to protrude; these ears pass through and are guided by openings 77 in the two sides 74 of the trough until a point is reached where gaps 78 in these two sides receive two spring-arms 79 on the upper end of a vertical rod 80 sliding in a guide $80^x$ fixed to platform $a^x$; these spring arms rise and turn the tabs or ears upward against the sides of the bag (see Figs. 8, 26, 27 and 28) and the said tabs are retained in this turned-up position by a continuation of the sides 74 of the trough. The vertical rod 80 is operated by a link 81 pin-jointed to it, and having a forked lower end which takes over and slides on the shaft $b$. The link 81 has a friction-roller 82 which is acted upon by the cam 83 on the shaft $b$.

Figures 4, 13, 14:
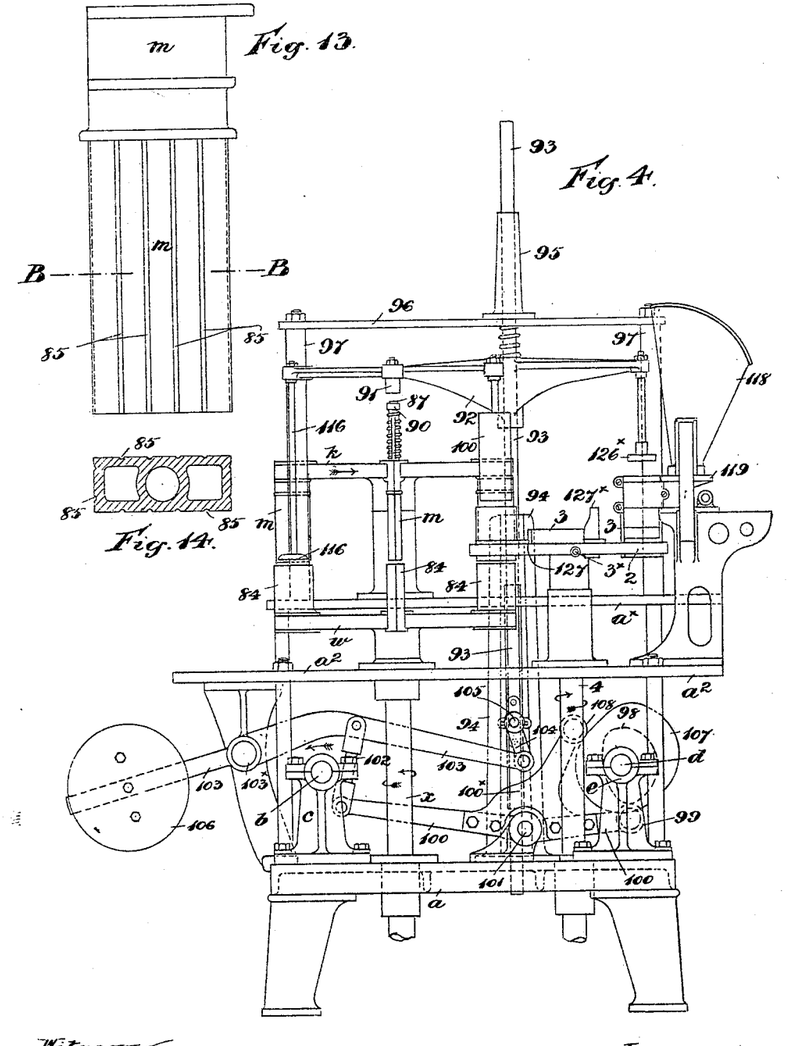

The further intermittent rotatory movement of the former wheel $k$ (which is on a higher level than the before mentioned intermittently rotating mold-wheel $w$) brings the bag over one of the molds 84 of the mold-wheel $w$, and a vertically acting plunger in the hollow former descends and engages with the bottom of the bag and forces the bag downward off the former into the mold 84 until the upper edges of the bag coincide with the upper edges of the mold. The outer surfaces of the formers $m$ are preferably grooved as shown at 85, Figs. 13 and 14, in order to prevent the formation of a vacuum, thereby facilitating removal of the bag therefrom.

Preferably the formers are left open at their lower ends, as shown in Fig. 16, and the plungers take the form of inner pistons 86 each having a central rod 87 around which is coiled a spring 88, the lower end of which bears against a cross bridge 89 and the upper end against a collar 90 fixed to the upper part of the rod 87; the constant tendency of the spring being to hold the piston 86 flush with the bottom of the former until pressed down by a plunger 91 acting upon the end of the rod 87. This plunger 91 is carried by a cross head 92 mounted on a rod 93 sliding up and down in a bearing or guide 94 fixed to the base plate $a$ and in a bearing 95 fixed to a cross bar 96 carried by the two pillars 97 secured to the upper platform $a^x$. The rod 93 and cross head 92 are raised into the elevated position shown in Figs. 1, 2, 3 and 4 by means of a cam 98 on the shaft $d$. This cam 98 acts upon a friction-roller 99 on one end of a lever 100 fulcrumed at 101, the other end of the lever being pin-jointed to one end of a link 102, the opposite end of which is pin-jointed to a lever 103 pivoted at $103^x$ one end of which lever is pin-jointed to one end of a link 104, the other end of which takes on to a pin 105 secured to the rod 93. The other end of the lever 100 carries a counter-balance weight 106 which assists the action of the cam 98 in raising the cross head 92 into its elevated position.

107 is a cam mounted on the shaft $d$, which acts upon the friction-roller 108 of a lever-arm $100^x$ bolted to or made integral with, the lever 100. This cam and lever effect the downward stroke of the rod 93 and cross head 92 against the action of the weight 106 when the plunger 91 and certain other plungers to be hereinafter described and connected to the same cross head are required to act.

The pistons 86 are guided by the guide-rods 109 sliding in holes in the cross bridges of the formers $m$.

The intermittent rotatory movement of the mold-wheel $w$ brings the mold 84 containing the bag, under one of the openings in the wheel 2 which carries the charging receptacles 3, to be hereinafter described, and the plunger 110 connected to the crosshead 92 then descends and forces the contents of the receptacle which is over the bag in the mold, into the said bag. The charged bag is then carried around by the mold-wheel $w$ until the bottom of the bag is opposite a vertical plunger 111 which is moved upward by the cam 112 on the shaft $d$ acting upon the friction-roller 113 and lever 114 pivoted at 115, and pushes the bag upward in the mold until its upper edges project beyond the mold. Suitable folding devices are then caused to fold the projecting upper edge and thereby to close the bag or packet, which is then carried farther around until it comes under a vertical plunger 116 attached to the cross-head 92 which descends on to its upper end and forces it out of the mold on to a conveyer-belt 117 or the like.

Figure 19:
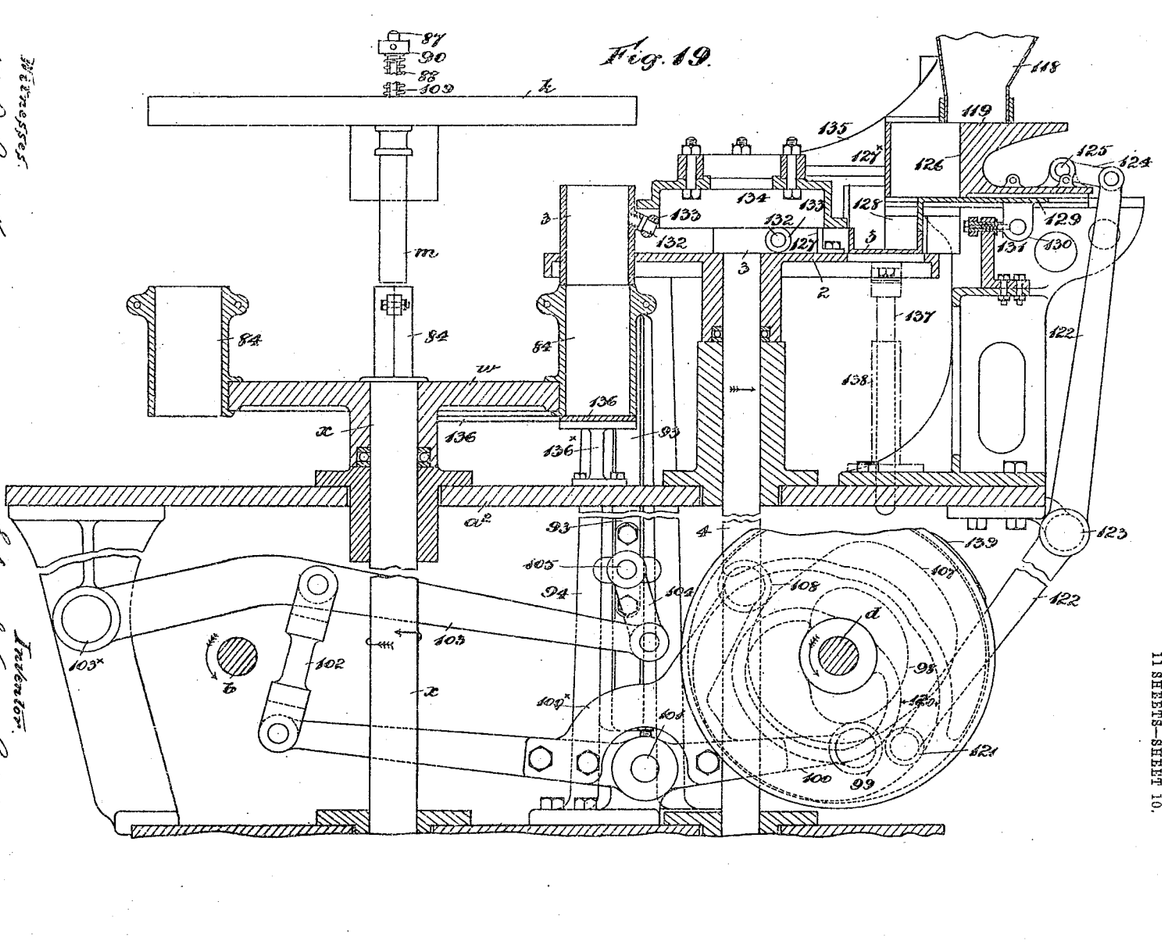
Fig. 19 is a sectional elevation taken on the line E—E of Fig. 5, but drawn to a larger scale than that figure, of the molds which receive the bags from the formers, and of the devices for charging the material (tobacco for example) into the bags when the latter are placed in the molds.

The charging receptacles 3 are charged with material (tobacco for example) in the following manner:—The desired charge is intermittently fed (by hand, an elevator, or otherwise) into a hopper 118 (see Fig. 19) adjacent to the charging wheel 2 which carries the charging receptacles 3. The charge falls on to a false bottom 119 at the lower part of the said hopper. This false bottom has a horizontal reciprocating motion imparted to it by means of a cam 120 acting upon the friction-roller 121 of a lever 122 pivoted at 123, and pin-jointed at its upper end to a link 124, pin-jointed at 125 to the false bottom 119. When the false bottom is withdrawn, to the right in Fig. 19, from the bottom of the hopper the charge falls into an open topped chamber or box 126 formed in or attached to the false bottom, which chamber, when the false bottom 119 is moved toward the left in the figure, brings the charge over one of the charging receptacles 3 on the charging wheel 2. This charging receptacle consists of a three-sided channel hinged at one end by a spring hinge $3^x$ (see Fig. 3) to the charging wheel 2, and lies normally on its broad side on top of the charging-wheel, its interior approximately coinciding with the shape of the paper bag. One end of the receptacle, when the latter is in this position, is closed by a bracket plate 127 attached to the top of the charging wheel, and the other end is closed temporarily by a flange 128 which projects from the open topped chamber or box 126. The vertically acting plunger 126ˣ connected with the crossheads 92 now descends, and forces the charge out of the chamber 126 into the charging receptacle 3. A horizontally reciprocating plate 129 forms a false bottom to the sliding box 126, and travels forward with the latter supporting the charge until a lug 130 on the said false bottom 129 reaches the stop 131 when the said false bottom stops, but the box 126 continues its movement until its reaches a position over the charging receptacle 3 when the plunger 126ˣ acts as before explained. The charging receptacle 3 having received the charge is carried around by the charging wheel 2, and an arm 132 attached to the side of the receptacle and having a friction-roller 133 on its end travels around under a stationary cam 134 fixed to the supporting bracket 135 and holds the receptacle 3 down in its horizontal position on the charging wheel 2 against the action of the spring hinge 3ˣ (which constantly tends to raise the receptacle into a vertical position) until the roller 133 reaches an upwardly curved part of the cam 134 (see Fig. 1) when the spring hinge causes the receptacle to assume the vertical position, shown clearly in Figs. 5 and 19, the top edges of the receptacle engaging with the plate 127ˣ fixed vertically upon the charging wheel 2, and which plate now forms the fourth side of the charging receptacle, and the charge (the slab of tobacco for example) is therefore inclosed on its four sides and now stands in its upright position, over the empty bag in one of the molds 84 in the mold-wheel $w$, (as shown in Fig. 19) and the charge is then forced out of the charging receptacle into the bag by the plunger 110 as hereinbefore described. After the expulsion of the charge from the receptacle into the bag in the mold and the further rotation of the charging wheel 2 the charging receptacle is again turned down by the action of the cam 134 upon the roller 133 into the open-sided horizontal position ready to receive another charge when it reaches the hopper and feeding devices. Should the material to be packed be unusually heavy or bulky the charging receptacles 3 may be operated by other suitable devices.

In order to prevent undue strain being put upon one side of the charging wheel 2 when the charge is being forced into the charging receptacle 3 by the plunger 126ˣ as above explained, that portion of the said wheel is supported from the underside by a sliding abutment 137 sliding in a guide 138 fixed to the upper platform $a^2$ (see Figs. 3 and 19) which abutment is forced upward and held up by the cam 139, mounted on a shaft $d$ at the moment when the pressure is exerted by the said plunger.

Figure 3:
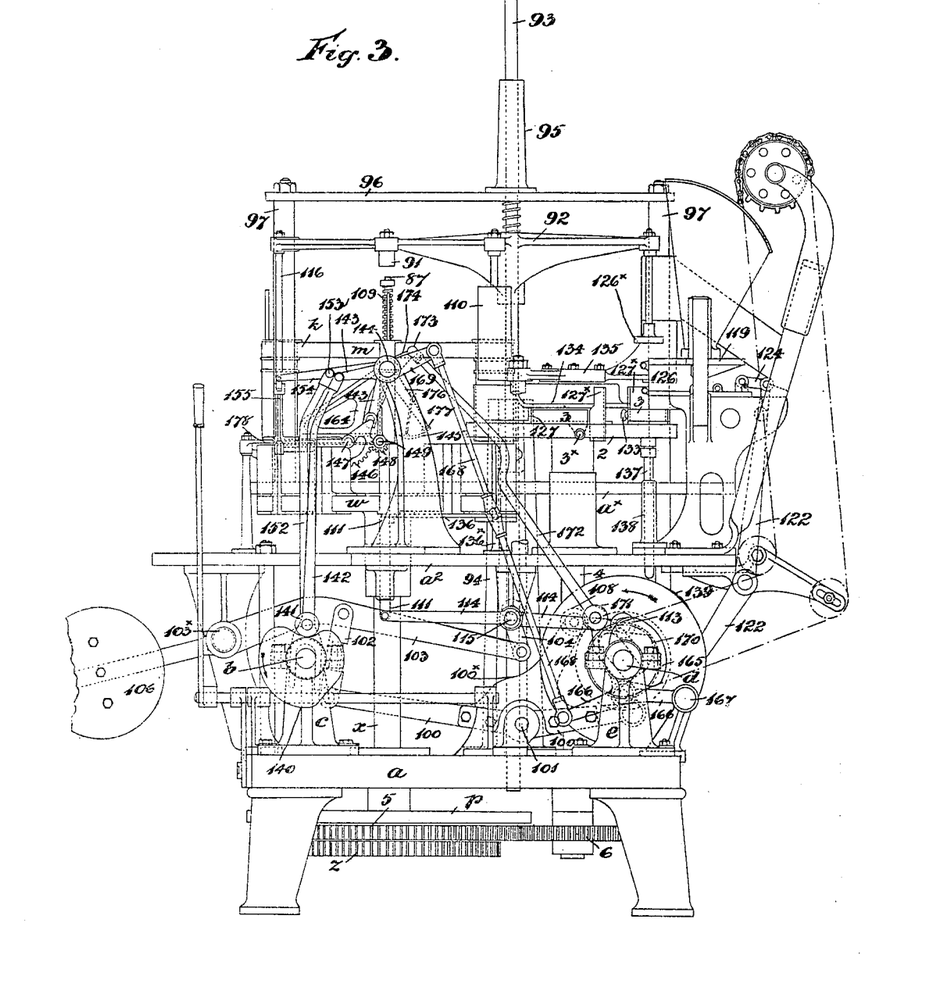
Fig. 3 is an elevation taken at right angles to Fig. 1 and looking from right to left in that figure.

In order to support the bag or packet after it has been pushed down off the former $m$ into the mold, and while it is being moved around with the mold wheel $w$ from the position where it has been so placed in the mold to the position where the tobacco is filled into it, and thence to the point where it is pushed up in the mold by the plunger 111, there is fixed below the molds a segmental plate 136 supported on pillars 136ˣ secured to the platform $a^2$ as shown in Figs. 3 and 19. This plate 136 not only supports the bag or packet and prevents it from falling out of the mold, but also prevents it from being pushed out by the plunger 110 as the latter forces the tobacco into it.

When the charged bag has been pushed up in the mold by the plunger 111, so that its upper edges project beyond the top of the mold, these upper edges are folded down by any suitable arrangement of folding devices, as for example by those shown in Figs. 1, 3, 5 and 6 of the drawings, and next hereinafter described.

140 is a cam mounted on the shaft $b$; this cam operates by the friction roller 141 the link 142 the lower end of which is forked and slides on the shaft $b$. The upper end of the link 142 is pin-jointed to one end of a bell-crank lever 143 pivoted on the stud 144 on the bracket 145 fixed to the platform $a^2$; the other end of the bell-crank lever is forked and engages with an arm of a toothed sector 146, pivoted at 147, and gearing with a sectoral pinion 148 fixed on an axis 149 carrying the folder which folds down the first top fold of the bag into the position indicated in Fig. 27.

150 is a cam mounted on the shaft $b$, this cam operates by the friction-roller 151, the link 152, the lower end of which is forked and slides on the shaft $b$. The upper end of the link 152 is pin-jointed at 153 to a lever 154 pivoted on the stud 144; the outer end of this lever 154 is pin-jointed to one end of a link 155, the other end is pin-jointed to the arm of a toothed sector 156 turning on the axis 157, and gearing with a sectoral pinion 158 fixed on the axis 159 of the folder, not shown in the drawings, which folds down one of the second top folds of the bag, indicated in Fig. 28. On the axis 159 is mounted a toothed sector 161, which gears with a sectoral pinion 162 fixed on the axis of the folder, not shown in the drawings, which folds down the other of the second top folds of the bag indicated in Fig. 28. The axes of the folders are carried in bearings in the frame 164 oscillating on the stud 144. This frame is operated at the proper time to bring the folders into position for acting upon the parts to be folded, by means of a cam 165 mounted on the shaft $d$ and acting upon a lever 166 pivoted at 167 and pin-jointed at its free end to a connecting rod 168 the upper end of which is pin-jointed to an arm 169 extending from the frame 164.

Figure 29:
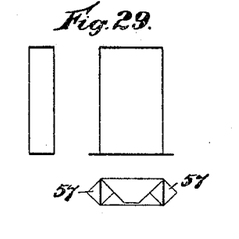

170 is a cam mounted on the shaft $d$; this cam operates by the friction-roller 171, the link 172 the lower end of which is forked and slides on the shaft $d$. The upper end of the link 172 is pin-jointed at 173 to a lever arm 174 of a boss 175 turning on the stud 144; a second lever arm 176 of the boss 175 carries the folder 177 which folds down the last top fold of the bag as indicated in Fig. 29 which shows the completed packet.

When the last top fold of the bag has been folded down and secured, if desired, by pasting, the said fold is held down (while the mold wheel $w$ is being further rotated in order to bring the so far completed packet under the plunger 116), by the fixed guide plate 178.

The bag or packet being expelled from the mold by the plunger 116 as hereinbefore explained, is received on to the conveyer belt or the like 117 on which it lies on its broad side, and with its length transverse to the belt. This belt passes around a drum 180 mounted on the shaft $b$, see Figs. 1 and 6, and is carried to any point where it is desired to deliver the completed packet.

In the above description of the machine the course of one bag or packet only has been followed but it will be understood that at each intermittent or step-by-step movement of the former wheel, mold-wheel and charging wheel, bags or packets are being simultaneously dealt with in the various consecutive stages of the operations. It will also be understood that the former-wheel, mold-wheel, and charging wheel may have any number of formers, molds and charging receptacles other than those above mentioned, the gearing for imparting the corresponding intermittent motions to the said wheels being arranged accordingly.

Claims.

1. A bag forming and filling machine comprising a wheel, a series of bag formers carried thereby, a tilting rest for presenting the paper making material to the formers, means for feeding the said material to the rest, segmental arms 20 for folding the said material against the two sides of the former, means for folding the bottom edges of the paper to form the bottom of the bag, bars 49 for holding the folded vertical edges of the bags against the inner edges of the former, a yielding path 73 for preventing the folded bottom of the bag from swinging open, a second wheel, a series of molds carried thereby, plungers for forcing the paper bags from the first wheel into said molds, a segmental plate below said second wheel forming a bottom for the molds, a third wheel, receptacles carried thereby, means for feeding the material to said receptacles, means for positioning said receptacles over the bags in the molds, means for forcing the material from the receptacles into the bags, means for closing the upper ends of the bags, and means for ejecting the filled and closed bags from the mold.

2. A bag forming and filling machine comprising a horizontal wheel $k$, hollow formers carried by said wheel, means for feeding the bag forming material to said formers, means for folding said material around the sides and bottom of said formers to form a bag with an open top, pistons in said formers, means for giving said wheel an intermittent rotary motion, a second wheel $w$ located below the horizontal plane of the first wheel, molds carried by said second wheel, means for giving said wheel an intermittent rotary motion, a reciprocating cross head having a projection thereon adapted to engage with the piston to cause the same to force the bag from the former into the mold, a segmental plate located below the second wheel forming a bottom for some of the molds, a third wheel, 2, located above the horizontal plane of the second wheel, receptacles carried by said third wheel, means for feeding material to said receptacle, a plunger operated by the cross head for forcing the material from the receptacle into the bags in the molds, a reciprocating plunger for slightly raising the bag out of the mold, means for folding over the top edges of the bag while in its raised position to close the same, and a plunger operated by the cross head for ejecting the closed bags from the molds.

3. A bag forming and filling machine comprising a forming device comprising formers, and a device for feeding the paper against the outer edges of the former which consists of the feeding rollers 10, a tilting rest receiving the paper from the rollers, guide bars arranged over the rest, means for tilting the rest to bring the paper against the former, and a slotted arm connecting the rest with the guide bars, whereby the guide bars will be carried out of the way when the rest is moved against the former.

4. In a device of the class described, a wheel $k$ having formers thereon, means for folding the bag forming material around the former, means for holding the folded edges of the bag against the inner edge of the former while the wheel is being rotated, said means consisting of a bar 49, a bracket secured to the wheel, guide rods in said bracket secured to the bar 49, a spring for normally holding the bar 49 out of contact with the bag, a fixed cam, and a roller connected with the bar 49 engaging with the cam.

5. In a device of the class described, a wheel $k$, formers thereon, means for feeding the bag forming material to the formers, means for folding the material around the former, means for folding the bottom edges of the material over the bottom of the former, said folding operation leaving end tabs 57 on the bottom of the bag, a trough located below the said wheel, a spring-urged bottom in said trough engaging with the bottom of the bag, cross pieces 75 carrying the sides of the trough and providing spaces 76, said sides leaving a space between themselves and the bottom of the trough through which the tabs project into the spaces 76, said sides having gaps therein, spring arms adapted to project into said gaps to force the tabs upwardly against the sides of the bag, and means for reciprocating said spring arms.

In testimony whereof I have signed my name to this specification in the presence of two subscribing witnesses.

EDWARD LEROY BRACY.

Witnesses:
STANLEY C. PHILLIPS,
CHAS. N. DANIELS.